Dec. 17, 1968         C. M. CASON III            3,417,288
PULSE POWER SUPPLY FOR DEFINED QUANTITIES OF ENERGY
Filed April 8, 1966

Charles M. Cason III,
INVENTOR.

BY Harry M. Saragovitz
Edward J. Kelly
Herbert Berl
Alfred E. Smith

United States Patent Office 3,417,288
Patented Dec. 17, 1968

3,417,288
PULSE POWER SUPPLY FOR DEFINED QUANTITIES OF ENERGY
Charles M. Cason III, Huntsville, Ala., assignor to the United States of America as represented by the Secretary of the Army
Filed Apr. 8, 1966, Ser. No. 541,397
6 Claims. (Cl. 315—241)

ABSTRACT OF THE DISCLOSURE

A high voltage power supply and switching circuit for supplying high electrical power pulses of specified quantities of energy to energize a laser flash tube. A high voltage transportable battery is connected though a switching circuit to a flash tube for a controlled period of time. The switching circuit may apply the power first to a capacitance and from the capacitance to the flash tube; or the switching circuit may apply the power directly through a fuse or electronic switch to the flash tube. In all cases a delay circuit is utilized to rapidly remove the pulse from the flash tube after the desired time period has lapsed.

---

This invention relates to a pulse power supply for providing high electrical power at specified quantities of energy and more particularly to the use of a battery and switching circuit for energizing a laser flash tube to produce high intensity radiation.

Basically, this invention utilizes a high voltage sealed rechargeable battery connected through a switch to a flash tube. A control circuit activates the switch, and the battery is then electrically connected to the flash tube for a controlled length of time of order of several millisecond. During this time period, electrical power (the battery will deliver approximately 25,000 kw.) is delivered into the flash tube. The battery is then turned off by the switch circuit after a defined quantity of energy (in the neighborhood of 75,000 joules) has been delivered to the flash tube. The battery and associated circuitry becomes a novel power supply for bash tube excitation.

Prior art systems use capacitor banks and unipolar generators for this application. They are one shot devices which are complicated and bulky. Also, considerable noise is generated as these devices are operated. Furthermore, they must be recharged before each operation.

The device to be described herein may be operated several times (nominally this corresponds to 50–100 operations) before a recharge would be required. It may sit in a charged state for 6 months or longer, ready to operate. It is about $\frac{1}{100}$ the size of a capacitor bank for the same quantity of stored energy, and it can hold a charge for a long period of time. It does not use noisy rotating machinery as required for unipolar machines. It may be transported in a charged state, used and then returned to be recharged.

It is, accordingly, an object of the present invention to provide a laser device with a battery operated power supply that is capable of generating the high energy short pulse lengths required for efficient operation of the flash lamps in high energy laser systems.

It is a further object of this invention to provide a portable power supply that can hold its charge for a long period of time.

The system according to the present invention utilizes a battery having the following characteristics:

Total recoverable stored energy _____joules__ $7.5 \times 10^5$
Total power _____kilowatts__ 25,000
Total volume _____cubic meters__ 0.1
Total operating time _____seconds__ 0.3
Pulsed operating time _____milliseconds__ 3
Internal impedance _____ohms__ 1

Such a battery may be constructed according to the teachings of P. L. Kapitza as described in the Royal Society of London Proceedings, Volume A, Number 105, pages 691–710, 1924. The battery, described by Kapitza, comprises a stack of two-plate cells arranged in series so that the end-plates serve as one intercell connection between adjacent walls. This is commonly referred to as pile-type construction. Such a battery can be designed to deliver any specified quantity of energy at a given voltage and current. A battery design consisting of laminated electroplates and electrolyte have been found best suited, since the current flows perpendicularly through all conductors, eliminating any jumper wires of the type found on ordinary automobile batteries.

The above-mentioned objects and advantages will become apparent upon reference to the following detailed description considered with the accompanying drawings wherein.

Figure 1:
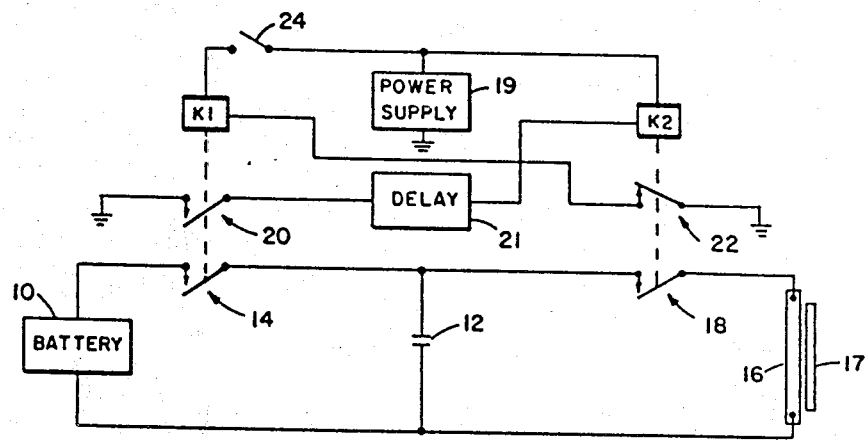
FIGURE 1 is a schematic diagram of a pulse power supply according to the invention utilizing vacuum relays as a switching means.

For a detailed description of the pulse power supply according to the invention, reference is now made to FIGURE 1 wherein reference numeral 10 denominates the high voltage sealed rechargeable battery. A capacitor bank 12 is connected in parallel with battery 10 through normally opened contacts 14 of relay $K_1$. A laser flash tube 16 is connected in parallel with capacitor bank 12, by means of normally open contacts 18 of relay $K_2$. A power supply 19 is provided for energizing relay $K_1$ and $K_2$ when switch 24 is closed. A circuit for relay $K_1$ is completed through normally closed contacts 22 of relay $K_2$, and a circuit for relay $K_2$ is completed through normally opened contacts 20 of relay $K_1$.

The operation of the circuit described in FIGURE 1 will now be explained. When switch 24 is closed, relay $K_1$ is energized by source 19 through contacts 22. When relay $K_1$ picks up, contacts 14 are closed, completing a circuit from battery 10 to capacitor bank 12 which then charges to a value equal to the voltage of battery 10. Also, when relay $K_1$ is energized, contacts 20 are closed completing the circuit through relay $K_2$ which, after an inherent time delay in the circuit, will pick up. When relay $K_2$ picks up, contacts 18 close, completing the circuit to flash tube 16 and contacts 22 open, opening the circuit to relay $K_1$. Capacitor bank 12 will now discharge through the flash tube 16 which then illuminates laser rod 17. Since energization of relay coil $K_2$ causes contacts 22 to open, relay $K_1$ will now drop off. When relay $K_1$ does drop off, relay $K_2$ will again drop off, leaving the circuit as it was when switch 24 was initially activated. Therefore, the cycle will be repeated. This circuit will pulse the flash tube at a rate of approximately fifty times per second, depending on circuit parameters. Relays $K_1$ and $K_2$ are vacuum relays rated at 50 kv. and 5,000 amperes.

Figure 2:
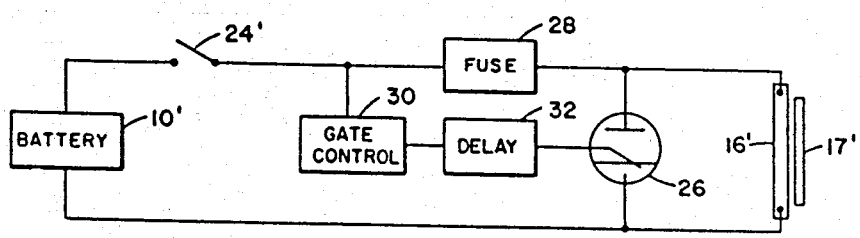
FIGURE 2 is a schematic diagram of a second embodiment of the present invention utilizing an ignitron as the off-switch.

The second embodiment of the invention is shown in FIGURE 2 wherein similar reference numerals primed are applied to similar elements. An ignitron 26 is connected in parallel with flash tube 16′. Fuse 28 is connected in series with flash tube 16′, and gate control circuit 30 is connected to the igniter of ignitron 26 through delay means 32. When switch 24′ is closed, battery 10′ discharges through flash tube 16′ and simultaneously applies the voltage to igniter of ingitron 26 through gate control circuit 30 anud delay means 32. It seems, therefore, that after a suitable delay, that ignitron 26 will begin to conduct, therefore short circuiting flash tube 26'. After ignitron 26 conducts, it is seen that fuse 28 will blow, interrupting the circuit to flash tube 16', thereby providing a pulse of energy to flash tube 16' for a suitable period, depending upon the time constants of delay circuit 32 and the characteristics of fuse 28. It seems that whereas the circuit of FIGURE 1 operates approximately fifty times per second, the circuit of FIGURE 2 requires a fuse replacement after each pulse.

Figure 3:
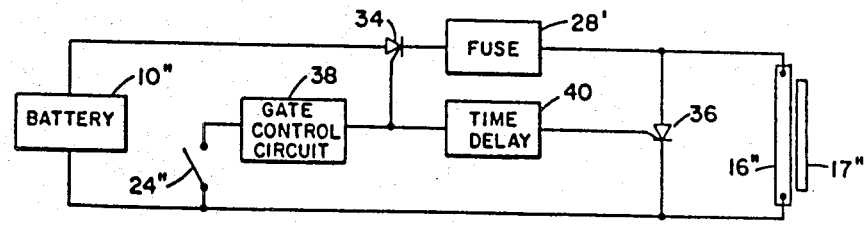
FIGURE 3 is a schematic diagram of a third embodiment of the present invention utilizing silicon controlled rectifiers as a switching means.

A modified form of the circuit of FIGURE 2 is shown in FIGURE 3. Again, similar reference numerals primed are applied to similar elements. This embodiment utilizes silicon controlled rectifiers 34 and 36 as "on" and "off" switches. Rectifier 34 has its anode and cathode circuit connected in series with fuse 28', and rectifier 36 has its anode and cathode circuit connected in parallel with flash tube 16". A gate control circuit 38 is provided for providing gate control signals to rectifiers 34 and 36 with a time delay means inserted between gate control circuit 38 and the gate of rectifier 36. When switch 24" is closed, a gate control signal is applied to the gate electrodes of rectifiers 34 and 36, and rectifier 34 conducts, completing the circuit to flash tube 16". After a suitable time delay, rectifier 36 will conduct, short circuiting flash tube 16" which permits fuse 28' to rupture, and thereby interrupt the circuit to flash tube 16". This circuit has the advantage of providing an "on" time of approximately one microsecond and an "off" time of one microsecond. A further advantage of this circuit is that the power delivered to flash tube 16" is very predictable.

While this invention has been described with reference to specific embodiments, it will be apparent that various modifications and changes may be made without departing from the spirit of the invention as defined in the appended claims.

I claim:

1. A pulse power supply for providing high electrical power at specified quantities of energy comprising: a high voltage battery; capacitor means having a first terminal connected to a first terminal of said battery; first switching means operable to connect a second terminal of said capacitor means to a second terminal of said battery; a laser flash tube load having a first terminal connected to said first capacitor terminal; second switch means operable in response to said first switch means for connecting a second terminal of said load to said second capacitor terminal, said second switch means also including means for inactivating said first switching means.

2. A pulse power supply for providing high electrical power at specified quantities of energy comprising: a high voltage battery; switching means connected to a first terminal of said battery; a fuse having a first terminal connected to a second terminal of said switching means; a laser flash tube having a first terminal connected to a second terminal of said fuse and a second terminal connected to a second terminal of said battery; shunting means connected across said tube; and delay means responsive to said switching means for activating such shunting means.

3. A pulse power supply as set forth in claim 2 wherein said switching means is a silicon controlled rectifier.

4. A pulse power supply as set forth in claim 2 wherein said shunting means is an ignitron.

5. A pulse power supply as set forth in claim 2 wherein said shunting means is silicon controlled rectifier.

6. A pulse power supply as set forth in claim 2 wherein said switch means and said shunting means are silicon controlled rectifiers.

References Cited

UNITED STATES PATENTS

| | | | |
|---|---|---|---|
| 2,496,543 | 2/1950 | Kanner | 328—59 |
| 2,571,027 | 10/1951 | Garner | 317—16 |
| 2,679,618 | 5/1954 | Brown et al. | 315—207 |
| 2,829,315 | 4/1958 | Hoekstra | 315—208 |
| 3,120,620 | 2/1964 | Nowell | 307—88.5 |
| 3,122,677 | 2/1964 | Flieder | 315—241 |
| 3,211,964 | 10/1965 | Thorne | 317—151 |
| 3,215,896 | 11/1965 | Shattuck et al. | 317—16 |

JAMES D. KALLAM, *Primary Examiner.*

J. R. SHEWMAKER, *Assistant Examiner.*

U.S. Cl. X.R.

315—209, 207, 241, 240; 317—132, 141